(12) United States Patent
Ulrey et al.

(10) Patent No.: US 8,371,118 B2
(45) Date of Patent: Feb. 12, 2013

(54) OXIDANT INJECTION TO REDUCE TURBO LAG

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 872 days.

(21) Appl. No.: 12/498,762

(22) Filed: Jul. 7, 2009

(65) Prior Publication Data

US 2011/0005505 A1 Jan. 13, 2011

(51) Int. Cl.
*F02B 33/44* (2006.01)
*F02B 23/00* (2006.01)
*F02M 23/00* (2006.01)
*F02M 27/00* (2006.01)

(52) U.S. Cl. .......... 60/598; 123/585; 123/586; 123/588; 123/539

(58) Field of Classification Search .......... 60/598, 60/284; 123/179.3, 585, 586, 588, 539
See application file for complete search history.

(56) References Cited

U.S. PATENT DOCUMENTS

| | | | | |
|---|---|---|---|---|
| 5,064,423 A | * | 11/1991 | Lorenz et al. | 123/586 |
| H1466 H | * | 8/1995 | Stapf | 123/585 |
| 5,687,682 A | | 11/1997 | Rembold et al. | |
| 5,960,777 A | | 10/1999 | Nemser et al. | |
| 6,067,973 A | * | 5/2000 | Chanda et al. | 123/585 |
| 6,352,068 B1 | * | 3/2002 | Jacobsen | 123/585 |
| 6,523,529 B1 | | 2/2003 | Moncelle | |
| 6,640,794 B2 | | 11/2003 | Weber | |
| 6,684,630 B2 | | 2/2004 | Uchida et al. | |
| 6,722,352 B2 | | 4/2004 | Smolareck et al. | |
| 6,938,420 B2 | | 9/2005 | Kawamura et al. | |
| 6,971,367 B2 | | 12/2005 | Satou et al. | |
| 7,128,064 B2 | * | 10/2006 | Heider | 123/585 |
| 7,198,024 B2 | | 4/2007 | Coleman et al. | |
| 7,377,272 B2 | * | 5/2008 | Davidson | 123/585 |
| 8,176,884 B2 | * | 5/2012 | Tewari et al. | 123/585 |
| 2002/0069851 A1 | | 6/2002 | Doring et al. | |
| 2004/0173165 A1 | | 9/2004 | Sieber et al. | |
| 2007/0119169 A1 | * | 5/2007 | Berger et al. | 60/600 |
| 2008/0047830 A1 | | 2/2008 | Fairfull et al. | |
| 2008/0092831 A1 | | 4/2008 | Simon | |
| 2008/0257304 A1 | | 10/2008 | Noda et al. | |

FOREIGN PATENT DOCUMENTS

WO 2007101329 9/2007

OTHER PUBLICATIONS

Pursifull, Ross D., "Oxidant Injection During Cold Engine Start," U.S. Appl. No. 12/498,754, filed Jul. 7, 2009, 30 pages.
Ng, H.K. and R.R. Sekar, "Potential Benefits of Oxygen-Enriched Intake Air in a Vehicle Powered by a Spark-Ignition Engine," Center for Transportation Research, Energy Systems Division, Sponsored by the U.S. Department of Energy, Office of Transportation Technologies, Apr. 1994, 50 pages.

* cited by examiner

*Primary Examiner* — Mary A Davis
(74) *Attorney, Agent, or Firm* — Julia Voutyras; Alleman Hall McCoy Russell & Tuttle LLP

(57) ABSTRACT

Various systems and methods are described for controlling an engine with a turbocharger in a vehicle. One example method comprises, under selected operating conditions, generating an oxidant rich component from engine intake air, storing the oxidant rich component, and during subsequent increased torque request, injecting an amount of the stored oxidant rich component to the engine.

19 Claims, 4 Drawing Sheets

OXIDANT INJECTION TO REDUCE TURBO LAG

TECHNICAL FIELD

The present application relates generally to an engine in a motor vehicle including a turbocharger with a compressor and a turbine.

BACKGROUND AND SUMMARY

A vehicle with a turbocharger coupled to its engine may experience a condition known as "turbo lag" during engine operation. Since the turbocharger is powered by exhaust gas energy, a delay (e.g., turbo lag) occurs in response to a request for increased torque when the turbine and/or compressor are not at speeds at which they may supply sufficient boost pressure to increase the engine torque, such as when the engine is coming out of an idle condition.

The inventors herein have recognized the above problems and have devised various approaches to at least partially address them. Thus a method for generating an oxidant rich component of engine intake air and storing the oxidant rich component is disclosed. The method comprises, under selected operating conditions, generating an oxidant rich component from engine intake air, storing the oxidant rich component of the intake air, and, during subsequent increased torque request, injecting an amount of the stored oxidant rich component to the engine.

Specifically, in one example, the oxidant rich component of the engine intake is generated when boost is greater than a threshold amount. In this manner, oxidant rich air is generated during operation above a threshold boost pressure, for example, via a turbocharger that is coupled to the engine and the oxidant rich air is stored so that it can be used at a later time, such as during turbo lag.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling an engine in a motor vehicle, wherein a turbocharger with a turbine and a compressor is coupled to the engine. The compressed air produced by the turbocharger may be utilized in an oxidant rich air generator, which generates an oxidant rich component and a waste component of the compressed engine intake air. Additionally, the oxidant rich component of the engine intake air may be stored in a storage tank so that is available for use during selected engine operation. Such engine operation may include an increased torque request as a result of turbo lag. During turbo lag, the oxidant rich air generated by the oxidant rich gas generator may be injected to the engine. As an example, one result of injecting oxidant rich air to the engine during turbo lag is an increase in combustion temperature, and therefore, an increase in the exhaust gas temperature. The increased exhaust gas temperature assists in accelerating the turbine of the turbocharger and, in this manner, the duration of turbo lag may be reduced.

Figure 1:
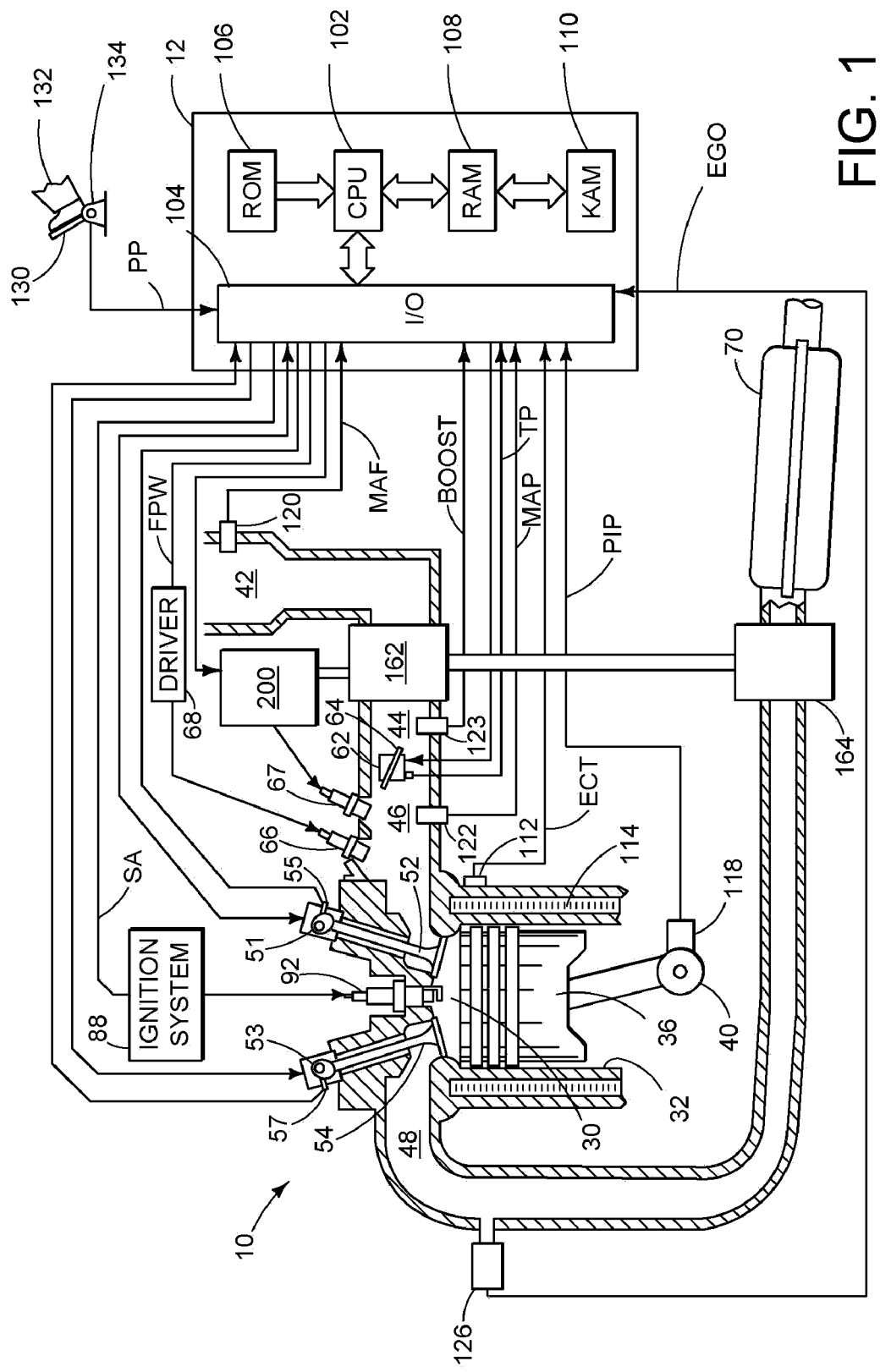
FIG. 1 shows a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

An oxidant rich gas generator 200 may be coupled to the turbocharger, as shown in FIG. 1. Oxidant rich gas generator 200 is shown receiving compressed engine intake air from compressor 162. Oxidant rich gas generated by oxidant rich gas generator 200 may be selectively injected to the engine via injector 67 based on a signal received from controller 12. As depicted in FIG. 1, injector 67 is arranged in intake passage 44 in a configuration that provides port injection of the oxidant rich gas into the intake port upstream of combustion chamber 30. In some embodiments, the oxidant rich gas may be supplied via an air assist injector rather than via a separate injector as described above. In further embodiments, the oxidant rich gas may be supplied via an air assist injector rather than via a separate injector as described above. In further embodiments, combustion chamber 30 may alternatively or additionally include an oxidant rich gas injector coupled directly to combustion chamber 30 for injecting oxidant rich gas directly therein.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
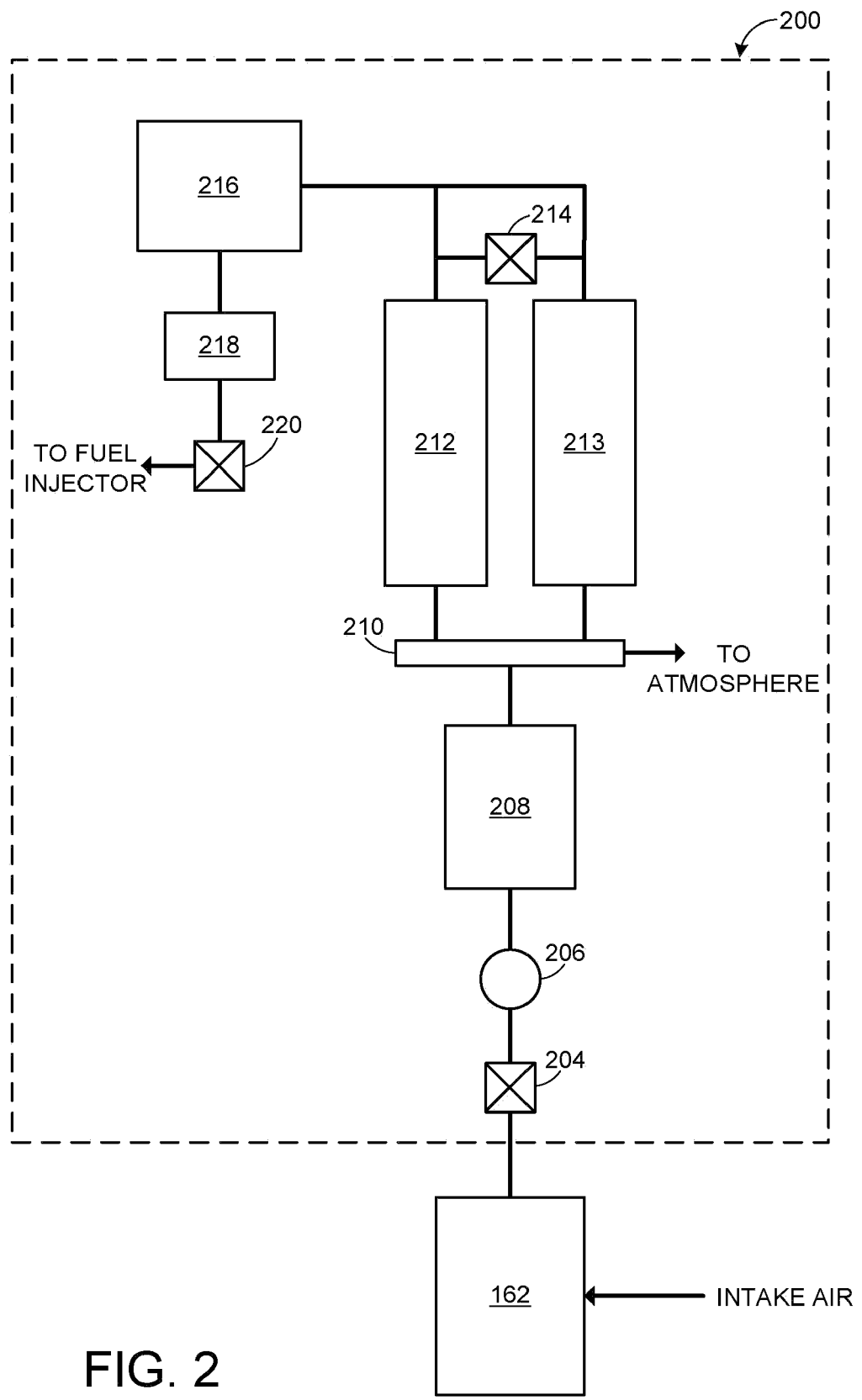
FIG. 2 shows a schematic diagram of an example oxidant rich gas generator.

Various mechanisms may be used for producing oxidant rich air such as pressure swing adsorbtion (described further with respect to FIG. 2) and molecular sieves. Pressure swing adsorbtion cycles the air in and out of beds to separate the nitrogen and oxygen. Molecular sieves are a continuous process that uses sieves, allowing the small molecules to pass more readily than the large molecules. FIG. 2 shows a schematic diagram of an example oxidant rich gas generator, such as the oxidant rich gas generator 200 shown in FIG. 1. As illustrated in FIG. 2, engine intake air enters compressor 162 which is part of the turbocharger coupled to engine 10. In some embodiments, compressor 162 may be connected to a valve 204 which controls the flow of air to the oxidant rich gas generator 200. When valve 204 is in the closed position, engine intake air flows through the compressor to intake manifold 44 where it enters the combustion chamber 30. If valve 204 is in the open position, a portion of the compressed engine intake air is permitted to enter the oxidant rich air generator and storage device 200.

Oxidant rich gas generator 200 uses the energy in pressurized and/or heated air to create a stream of pressurized, oxygen enriched air. Since the air is pressurized, it may be effectively stored in a conventional tank or an adsorbtive tank for future use. In some embodiments, it is beneficial if the air is pressurized above the pressure of the intake manifold which may operate at a pressure lower than atmospheric.

Engine intake air that passes through valve 204 is routed to heat exchanger 206 where it is cooled before entering air surge tank 208. Air surge tank 208 reduces air pressure fluctuations of the incoming air. Additionally, air surge tank 208 may include a wick (not shown) that removes moisture from the incoming air and allows the moisture to be evaporated to the atmosphere.

After exiting air surge tank 208, the compressed and cooled engine intake air is sent to molecular sieve beds 212 and 213. Sieve beds 212 and 213 may be filled with a material capable of adsorbing a selected constituent from the incoming air. Examples of a suitable material for filtering the air include, but are not limited to, carbon and zeolite. As an example, because the incoming air is comprised of substantially ambient air, the sieve beds may be configured to filter oxygen or nitrogen from the incoming air. Thus, when nitrogen is the filtered constituent, the resulting air that exits the sieve beds is rich in oxygen (e.g., oxidant rich air).

Control valve 210 controls the flow of incoming air into the sieve beds 212 and 213. Control valve 210 is comprised of a plurality of control valves which control the flow of air into and out of each sieve bed 212 and 213. In one embodiment, control valve 210 may allow compressed and cooled incoming air to enter sieve bed 212, while incoming air is prevented from entering sieve bed 213. Before nitrogen completely saturates the sieve bed, control valve 210 may operate to vent the nitrogen to the atmosphere. As nitrogen is vented from sieve bed 212, control valve 210 may allow compressed and cooled incoming engine intake air to enter sieve bed 213 for filtering. Further, during the process of alternate feeding and venting of the sieve beds 212 and 213, cross-over valve 214 may allow oxygen rich air to purge the sieve bed that is venting nitrogen to the exhaust.

Once oxygen rich air exits sieve beds 212 and 213, it is routed to storage tank 216 where it is stored. In some embodiments, a second compressor may be positioned between the molecular sieves 212 and 213 and the storage tank 216. In such an embodiment, the oxidant rich air is further compressed in order to further increase the pressure of the air above the pressure provided by the compressor coupled to the turbocharger. Thus, an even greater amount of oxidant rich air may be stored in the storage tank 216.

When oxygen rich air is requested, valve 220 opens to allow the air to enter the engine via an injector. As shown in FIG. 2, after exiting the storage tank 216 and before leaving the oxidant rich gas generator 200 through valve 220, the oxygen rich air passes through a regulator 218 in order to establish a fixed output pressure of the oxygen rich air.

In this manner, engine intake air that is compressed via a turbocharger coupled to the engine may be utilized as a source for oxidant rich air. By passing the compressed engine intake air through an oxidant rich generator comprising molecular sieve beds and a storage tank, oxidant rich air may be generated and stored for later use, such as enriching the engine air with oxygen during turbo lag. As an example, once the oxidant rich air is generated and stored, it may be utilized during a subsequent opening of the throttle, before boost reaches a threshold amount, and before the turbocharger reaches a threshold speed. Examples of generating and utilizing oxidant rich air under select boosted conditions are described below with reference to FIGS. 3 and 4, respectively.

Figure 3:
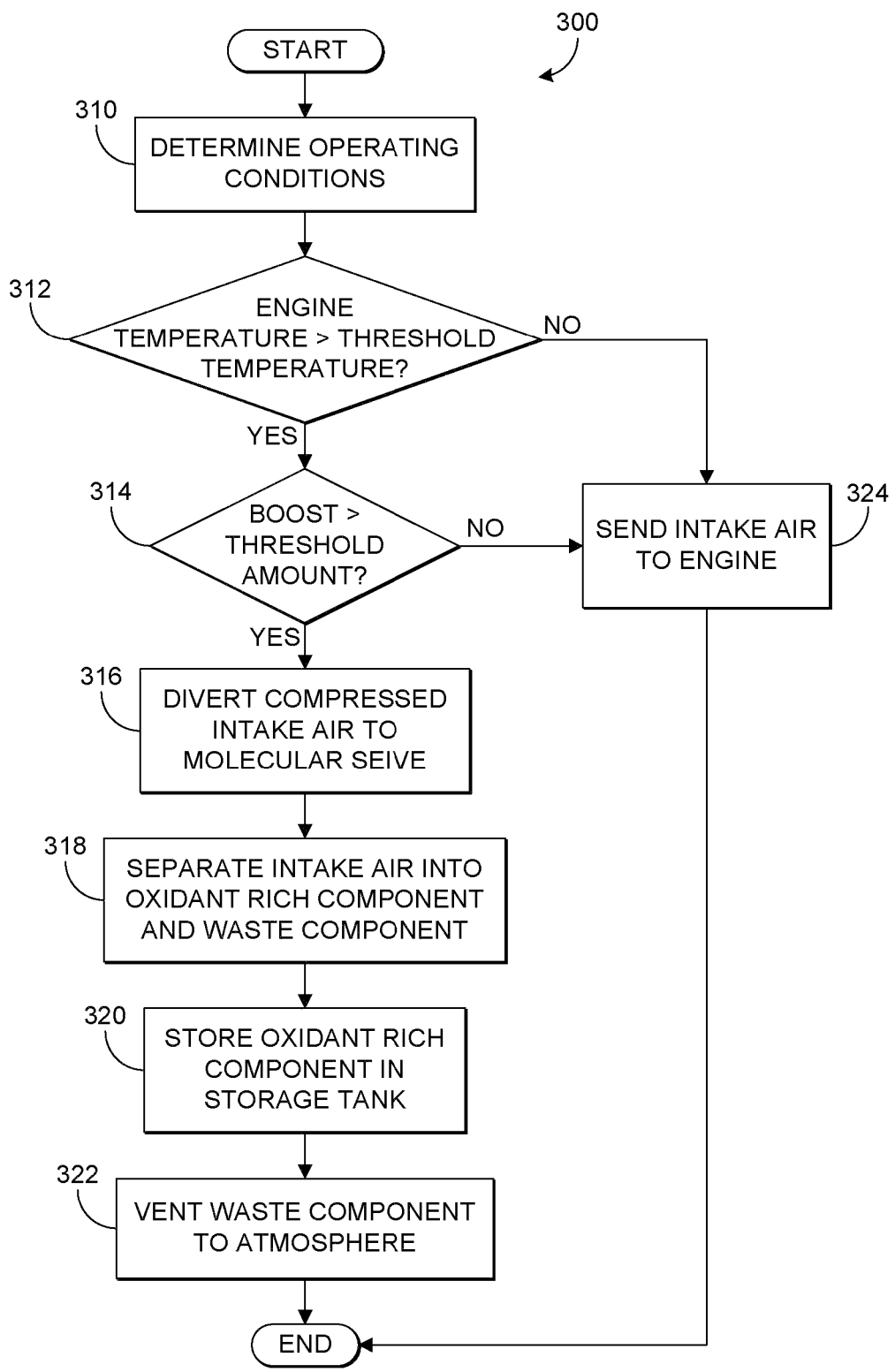
FIG. 3 shows a flow chart illustrating a routine for generating an oxidant rich component from engine intake air.

First, the flow chart in FIG. 3 shows a control routine 300 for generating an oxidant rich component from engine intake air. Specifically, routine 300 determines if the engine is under appropriate operating conditions for generating an oxidant rich component of the intake air and controls the flow of engine intake air accordingly.

At 310 of routine 300, engine operating conditions are determined. Engine operating conditions may include, but are not limited to, engine speed and boost pressure.

Routine 300 then proceeds to 312 where it is determined if the engine temperature is greater than a threshold temperature. In some examples, the molecular sieve may not operate efficiently until it has reached an appropriate operating temperature. If the engine is less than a threshold temperature, routine 300 advances to 324 where the engine intake air is sent to the engine (and a portion of the intake air is not diverted to the oxygen rich gas generator). If the engine temperature is above a threshold temperature, however, routine 300 proceeds to 314.

At 314 of routine 300 in FIG. 3, it is determined if boost is greater than a threshold amount. If boost is below a threshold amount, the engine speed may not be high enough and, therefore, the turbine may not be spinning at a high enough speed to power the compressor. In this case, the engine intake air is not compressed and the oxidant rich air generator is not operated to generate an oxidant rich component of the intake air. As such, if boost is below a threshold amount, routine 300 moves to 324 and engine intake air is sent to the engine.

On the other hand, if boost is greater than a threshold amount, the turbine is spinning fast enough for the compressor to compress the engine intake air and oxidant rich air may be generated. Thus, routine 300 proceeds to 316 where compressed engine intake air is diverted to the oxidant rich gas generator. In some embodiments, as described above, the oxidant rich gas generator may have a valve (e.g., valve 204 in FIG. 2) which controls the flow of air into the oxidant rich gas generator. In such an embodiment, at 316, the valve may be opened to allow air to flow into the oxidant rich gas generator.

Furthermore, in order to generate engine intake air with an even greater pressure (e.g., excess boost), which may be beneficial for the oxidant rich gas generator, a wastegate of the turbocharger may be closed. For example, because the wastegate limits the amount of boost applied to the throttle inlet, if the wastegate is closed, the pressure of the air that enters the oxidant rich gas generator may be further increased.

Moving on, at 318 of routine 300 in FIG. 3, engine intake air that flows into the oxidant rich gas generator is separated into an oxidant rich component and a waste component. As described above, the molecular sieve may operate to filter nitrogen from the incoming engine intake air which is comprised substantially of ambient air (e.g., air that is approximately 21% oxygen and 78% nitrogen), resulting in oxygen rich air exiting the sieve beds. Thus, in this example, the oxidant rich component is substantially comprised of a greater concentration of oxygen than is found in the atmosphere and the waste component has a lower concentration of oxygen than is found in the atmosphere After exiting the molecular sieve beds, the oxidant rich component of the intake air flows to a storage tank at 320 of routine 300. The storage tank may store the oxidant rich air until the air is requested. Because the oxidant rich air is stored, it may be used at a later time and, in addition, a source of oxidant rich air may be available during conditions when the turbocharger is not generating boost, or the system is unable to generate the oxidant rich air. For example, the stored oxidant rich air may not be utilized until a subsequent cold start of the vehicle. Furthermore, as mentioned above, the stored oxidant rich air may be stored in a compressed state relative to ambient pressure. In this way, a greater amount of oxidant may be stored in a smaller volume as compared to an oxidant rich gas stored at ambient pressure, and a greater amount of oxidant rich gas may be injected to the engine as well, which may further increase the combustion temperature during turbo lag.

Further, as engine intake air passes through the sieve beds, the sieve beds collect the waste component of the air (e.g., nitrogen). As such, the sieve beds are vented at 322 of routine 300 in order to prevent the sieve beds from becoming saturated with the waste component, which can lead to a failure of the filtering process. The waste component is vented to the atmosphere.

Figure 4:
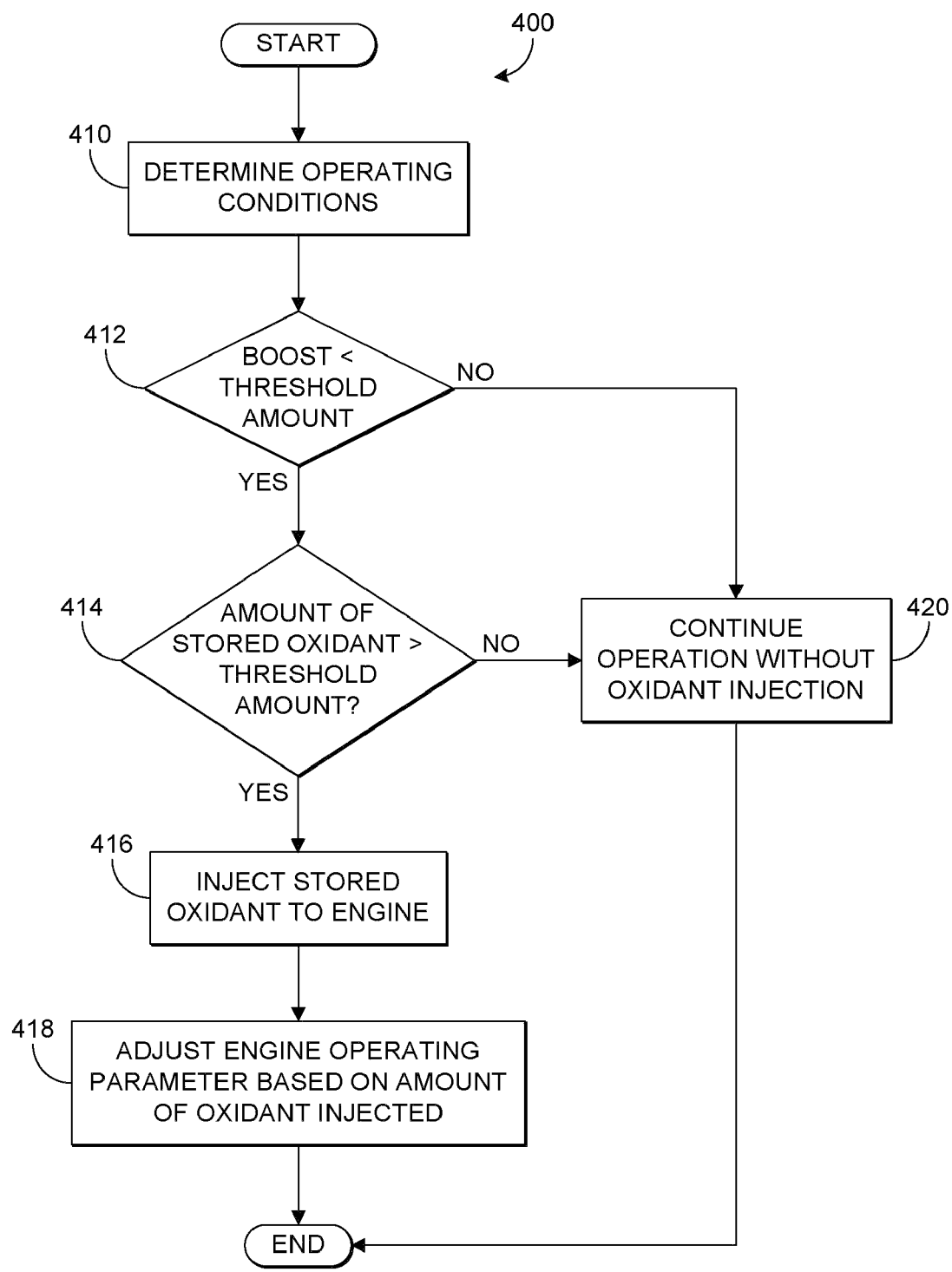
FIG. 4 shows a flow chart illustrating a routine for injection an oxidant rich component to an engine cylinder.

Once an oxidant rich component of the engine intake air has been generated and stored, as described with reference to FIG. 3, the stored oxidant rich air may be utilized during selected engine operating conditions, for example, during a subsequent boost request when the turbocharger is accelerating in order to reduce turbo lag (e.g., before the turbocharger reaches a threshold speed). The flow chart in FIG. 4 depicts a control routine 400 for injecting the oxidant rich air into the engine during a selected operating condition. Specifically, the routine controls an amount of oxygen rich air injected to the engine based on an increased torque request, such as an operator-generated torque-increasing request, and the current boost pressure. Further, various engine operating parameters are adjusted in response to the amount of oxidant that is injected.

At 410 of routine 400, engine operating conditions are determined. Engine operating conditions may include, but are not limited to, boost level, turbine/compressor speed, spark timing, and air-fuel ratio.

Once the operating conditions are determined, routine 400 proceeds to 412 where it is determined if boost is less than a first threshold amount. If the boost pressure is greater than the first threshold amount, routine 400 moves to 420 where operation continues without injecting oxidant to the engine. In some examples, if the boost pressure is great enough (e.g., greater than a second threshold amount), routine 400 may move to 316 of routine 300, where compressed engine intake air is diverted to the oxidant rich gas generator and oxidant rich gas is stored, as described above with reference to FIG. 3.

Continuing with FIG. 4, if the boost pressure is less than a first threshold amount, routine 400 proceeds to 414 where it is determined if an amount of stored oxidant is greater than a threshold amount. In some embodiments, the amount of stored oxidant may be determined via a temperature or pressure sensor coupled to the storage tank. In other embodiments, the amount of stored oxidant may be determined by checking an amount of oxidant that was generated during previous operation. If the amount of stored oxidant rich gas is less than a threshold amount, there may not be enough oxidant to effectively increase the combustion temperature in the combustion chambers, and thus, increase the exhaust gas temperature to reduce the duration of turbo lag. As one example of a situation in which the amount of stored oxidant is too low, there may not be any stored oxidant because the system has been deactivated for a sufficient length of time. In another example, the oxidant rich gas may have been depleted during a previous increased torque request and the engine has not had an opportunity to generate more. Therefore, if there the amount of stored oxidant is less than a threshold amount, routine 400 advances to 420 where engine operation continues without injection of the stored oxidant.

On the other hand, if the amount of stored oxidant is greater than a threshold amount, routine 400 continues to 416 where stored oxidant is injected to the engine. The amount of oxidant rich air may vary based on one or more of the above-mentioned engine operating conditions. As one example, the amount of oxidant may vary depending on the amount of oxidant requested and the current boost level. For example, as the boost level increases, the engine may benefit from an increasingly smaller amount of oxidant to fill the torque deficit. Injecting oxidant increases the combustion temperature and as a result may increase the possibility of knock and/or $NO_x$ formation. Thus, once the boost level reaches the first threshold valve, oxidant injection may be cut-off as it may degrade the engine performance. In one particular example, spark timing may be adjusted (e.g., retarded) when providing the additional oxidant injection. For example, the amount of spark retard may be based on the amount of oxidant rich gas injected. In one example, as the amount of oxidant rich gas injected increases, the spark advance decreases, to maintain spark timing near MBT (optimum timing for torque production). In another example, as the amount of oxidant rich gas injected increases, the spark advance decreases, to reduce knock.

As another example, the amount of oxidant injected may be based on the speed of the turbocharger turbine/compressor when the torque is requested. This may be instead of or in addition to the boost level. For example, if the speed of the turbine is relatively low, the engine may benefit from a greater amount of oxidant to increase the speed of the turbine. On the other hand, if the speed of the turbine is relatively high, the engine may benefit from a smaller amount of oxidant, as too much may increase the possibility of knock and/or turbocharger over-speed conditions.

In another embodiment, the amount of oxidant injected may depend on the composition of the fuel, for example, fuel octane, alcohol composition (e.g., amount of ethanol), etc. A greater amount of oxidant may be injected for a higher octane fuel and/or a higher amount of alcohol in the fuel, as knock issues may be less likely.

In yet another embodiment, the amount of oxidant rich air injected may depend on the amount of oxidant that is stored. As an example, the more oxidant that is stored, the more oxidant there is to inject; thus, oxidant may be injected for a greater number of combustion events, for example.

Furthermore, the oxidant rich air may be injected at various times during a combustion event, or for varying durations of engine combustion events. In at least one condition, the oxidant may be injected while at least one cylinder of the engine is performing an intake stroke. Injecting the oxidant during an intake stroke of the engine cycle may aid in the mixing of the oxidant rich air with the fuel for combustion, for example. The oxidant may be injected transiently in order to maintain combustion stability, as the excess oxygen results in increased combustion temperatures.

Continuing with FIG. 4, after the oxidant rich air is injected to the engine, one or more engine operating parameters may be adjusted based on the amount of oxidant injected at 418 of routine 400. For example, in one embodiment, the spark timing may be adjusted based on the amount of oxidant injected and, in at least one condition, the spark timing may be temporarily retarded in response to an increase in the amount of oxidant rich air injected. By retarding the spark timing, conditions such as knock may be avoided In another example, an amount of fuel injected may be adjusted in response to at least the amount of oxidant rich air injected and, further, the fuel is combusted with the injected oxidant rich air in the combustion chambers of the engine. As such, the exhaust air-fuel ratio may be maintained at a desired air-fuel ratio, for example. In other examples, the opposite may occur, and the amount of oxidant injected may be adjusted based on the amount of fuel injected.

As described above, a stored oxidant rich component of engine intake air may be utilized under selected conditions, such as during turbo lag when boost is below a first threshold amount to fill in the torque deficit. Further, the amount of oxidant injected in order to reduce the turbo lag duration may be based on several factors, such as boost level and amount of increased torque requested. Moreover, if the boost level is above a second threshold amount, compressed engine intake air may be diverted to the oxidant rich gas generator where oxidant rich air is generated and stored for use during a subsequent increased torque request.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine with a turbocharger in a vehicle, comprising:
    during turbocharger boost greater than a threshold, generating an oxidant rich component from engine intake air;
    storing the oxidant rich component; and
    during a subsequent operation with turbocharger boost less than the threshold and a storage amount of the stored oxidant rich component is greater than a threshold level, injecting an amount of the stored oxidant rich component to the engine.

2. The method of claim 1 wherein the subsequent operation includes an increased torque request when the turbocharger is accelerating.

3. The method of claim 2 wherein the oxidant rich component is oxygen, and where the subsequent operation includes before the turbocharger reaches a threshold speed.

4. The method of claim 2 wherein the amount of the stored oxidant rich component injected is based on an amount of torque requested.

5. The method of claim 2 wherein the amount of the stored oxidant rich component injected is based on a boost pressure when the torque is requested.

6. The method of claim 1 wherein an amount of fuel injected in the engine is adjusted in response to at least the amount of the stored oxidant rich component injected, and where the subsequent operation includes boost below the threshold amount.

7. The method of claim 6 wherein the fuel is combusted with the injected oxidant rich component.

8. The method of claim 1 wherein the oxidant rich component is injected, in at least one condition, while at least one cylinder of the engine is performing an intake stroke, and where the subsequent operation includes during an opening of a throttle and before boost reaches the threshold amount and before the turbocharger reaches a threshold speed.

9. A method for controlling an engine having a turbocharger in a vehicle comprising:
    under select boosted operating conditions including turbocharger boost greater than a threshold, diverting a portion of intake air compressed by a compressor of the turbocharger to a molecular sieve where the intake air is separated into an oxidant rich component and a waste component;
    storing the oxidant rich component in a storage tank and venting the waste component to an exhaust manifold of the engine; and
    during a subsequent torque request with turbocharger boost less than the threshold and a storage amount of the stored oxidant rich component is greater than a threshold level, injecting an amount of the stored oxidant rich component to the engine.

10. The method of claim 9 wherein the select boosted operating conditions include boost greater than a threshold amount, and where the torque request is an operator-generated torque-increasing request.

11. The method of claim 9 wherein the amount of the stored oxidant rich component injected is based on an amount of increased torque requested and a current boost level.

12. The method of claim 9 wherein the amount of the stored oxidant rich component injected is based on a speed of a turbocharger turbine/compressor when the torque is requested.

13. The method of claim 9 wherein an amount of fuel injected in the engine is adjusted in response to at least the amount of the stored oxidant rich component injected and the fuel is combusted with the injected oxidant rich component to maintain exhaust air-fuel ratio at a desired air-fuel ratio.

14. A system for an engine in a vehicle, the system comprising:
    a turbocharger having a compressor;
    an oxidant rich gas generator receiving intake air from the compressor and separating the air into an oxidant rich component and a waste component;
    an oxidant storage tank;
    a control system configured to, under selected operating conditions including turbocharger boost greater than a first threshold, generate an oxidant rich component of the intake air; store the oxidant rich component in the oxidant storage tank; during a subsequent torque request and when a boost level is less than the first threshold amount and a storage amount of the stored oxidant rich component is greater than a threshold level, inject an amount of the oxidant rich component to the engine; and adjust an engine operating parameter based on the injected oxidant rich component.

15. The system of 14 wherein the amount of the oxidant rich component injected is based on an amount of torque requested.

16. The system of 14 wherein the amount of the oxidant rich component injected is based on a speed of a turbocharger turbine when the torque is requested.

17. The system of 14 wherein the amount of the oxidant rich component injected is based on a boost pressure when the torque is requested.

18. The system of 14 wherein the engine operating parameter includes a spark timing, where in at least one condition, the spark timing is temporarily retarded in response to an increase in the amount of the oxidant rich component injected.

19. The method of claim 14 wherein an amount of fuel injected in the engine is adjusted in response to at least the amount of the oxidant rich component injected and the fuel is combusted with the injected oxidant rich component.

* * * * *